Figure 1:
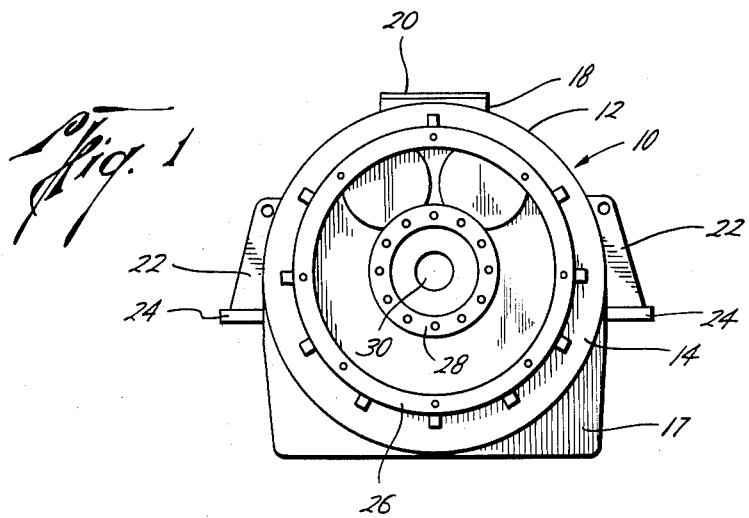

June 21, 1966  M. A. KRAMER ETAL  3,256,745
REVERSING POWER TRANSMISSION
Filed Aug. 16, 1963  4 Sheets-Sheet 1

Milton A. Kramer
Ernest O. Sodich
Emil A. Nakfoor
INVENTORS

BY James F. Weiler
Jefferson D. Giller
William A. Stout
Paul L. DeVerter II
ATTORNEYS June 21, 1966 M. A. KRAMER ETAL 3,256,745
REVERSING POWER TRANSMISSION
Filed Aug. 16, 1963 4 Sheets-Sheet 2

Milton A. Kramer
Ernest O. Sodich
Emil A. Nakfoor
INVENTORS

BY
ATTORNEYS

June 21, 1966  M. A. KRAMER ETAL  3,256,745
REVERSING POWER TRANSMISSION
Filed Aug. 16, 1963                        4 Sheets-Sheet 3

Milton A. Kramer
Ernest O. Sodich
Emil A. Nakfoor
INVENTORS

BY
ATTORNEYS

June 21, 1966  M. A. KRAMER ETAL  3,256,745
REVERSING POWER TRANSMISSION
Filed Aug. 16, 1963  4 Sheets-Sheet 4

Milton A. Kramer
Ernest O. Sodich
Emil A. Nakfoor
INVENTORS

BY
ATTORNEYS

United States Patent Office 3,256,745
Patented June 21, 1966

3,256,745
REVERSING POWER TRANSMISSION
Milton A. Kramer, Ernest O. Sodich, and Emil A. Nakfoor, Houston, Tex., assignors to Gulf Kramer Corporation, Houston, Tex., a corporation of Texas
Filed Aug. 16, 1963, Ser. No. 302,512
11 Claims. (Cl. 74—361)

The present invention relates to an improved power transmission, and more particularly, relates to an improved power transmission of the gear type.

It is highly desirable to provide single multi-purpose gear type power transmissions which possess maximum flexibility as to their arrangement and application and one which may economically be utilized in a complete line of power transmission equipment, which utilizes standardized gearing and component parts, and which has a minimum number of parts.

It would be further desirable to provide a power transmission of the gear type in which the input and output shafts are either in line, or near in line, which is relatively compact, that is which has a high capacity for its size, which has a minimum length from input flange to output flange, which is rugged and has a relatively long life in relationship to its size, which has a minimum number of gears, and in which maximum serviceability is obtained.

It would be highly desirable to provide such a power transmission for a wide variety of purposes. For example, for use as an SAE flywheel mounted marine reverse reduction with clutches and as a marine reduction gear without clutches, as an SAE flywheel mounted reduction gear, for use as an SAE flywheel mounted speed increasing gear, for use as a reduction gear, a speed increasing gear, and a motor reducer gear and the like.

It would be further desirable to provide such a power transmission which is compact, has a low center of gravity, which can be symmetrical or non-symmetrical. Such a power transmission is highly desirable for use as a marine power transmission.

It would be further desirable to provide such a transmission with a disconnect clutch, preferably a unitized clutch pack assembly. It would be further desirable that the clutch packs, or a plurality of these clutch packs be located externally, outside the transmission housing proper. This feature is highly desirable in marine transmission and power-shift transmission where the main expendable wear component is the clutch. A clutch pack, so located, would not require removal or disassembly of the entire transmission package from the prime mover to inspect, service, or repair the clutches.

The present invention is directed to such a power transmission which has the advantages and features and which can be used as the power transmissions and for the purposes previously mentioned as well as for other purposes.

It is therefore an object of the present invention to provide an improved power transmission of the gear type which has the previously mentioned features and advantages.

A further object of the present invention is the provision of an improved power transmission of the gear type in which the input shaft and the output shaft are either in line or near in line with one another.

Yet a further object of the present invention is the provision of such a power transmission of the gear type which is compact and which has a relatively high capacity for its size.

Yet a further object of the present invention is the provision of such a power transmission of the gear type in which there is minimum length between the input flange and output flange of the power transmission.

Yet a further object of the present invention is the provision of such a power transmission which has 2–10% differential speed from forward to reverse. This is advantageous in marine applications since propellers are not as efficient in reverse as in forward.

Yet a further object of the present invention is the provision of such a power transmission of the gear type which is rugged and which has a relatively long life with respect to its size.

Still a further object of the present invention is the provision of such a power transmission of the gear type which has maximum serviceability of all parts and readily replaceable expendable wear components such as clutches and the like.

As previously mentioned the power transmission may be completely in line, that is, the input shaft is in line or near in line with the output shaft. In line reversing transmissions, however, such as marine, have some loss in capacity and volumetric efficiency with respect to the near inline design. Both of these transmissions, however, have many advantages.

For example, for marine application in both the inline and near inline designs an economy is affected in many instances by the elimination of two additional designs, both of which have the same rating and capacity. For example, most conventional designs are of the vertical offset type. Thus, in certain applications and uses, especially the higher horsepower requirements, where this excessive offset is objectionable or unacceptable, two additional designs have been required for the same size unit as the vertical offset standards, which are a right hand horizontal unit and left hand horizontal offset unit. These two units are eliminated in both the inline and near inline power transmissions. In addition, for use in marine boats and vessels, the inline and near inline power transmissions lower the center of gravity of the boat or vessel substantially thereby giving greater stability and better weight distribution.

A further advantage is that the inline and near inline power transmissions provide more head room or work area over the engine. This is particularly important in use of the power transmission in marine boats or vessels and it permits lower decks or roofs in these marine vessels where desired.

A still further advantage is that the inline and near inline both obtain high volumetric efficiency and compactness, although, as previously mentioned, some loss in capacity of volumetric efficiency is sacrificed in the inline with respect to the near inline.

Yet a further object of the present invention, and another aspect of the present invention, is the provision of such a power transmission which has a housing which is symmetrical about a central vertical plane. This results in the following advantages, among others, which are that identical power transmissions in twin installations for port and starboard units may be utilized, that is, the configuration, center of gravity, piping and the like may be identical. Economy of manufacture is obtained where identical port and starboard units are required and a well balanced engine-gear propulsion package is provided. This is particularly advantageous for use as a marine power transmission.

Still a further object of the present invention is the provision of such a type of power transmission which is accomplished through the use of only six external tooth gear elements disposed on parallel countershafts. For example, other gear arrangements might possibly result in an inline or symmetrical housing, but more gears and associated elements are required. The present power transmission with its advantages and features is accomplished with the use of only six gear elements on parallel shafts and without resort to idler, bevel or planetary gearing.

Yet a further object of the present invention is the provision of a power transmission having a minimum number of gears by which optimum reduction and reverse gearing is obtained.

A further object of the present invention is the provision of a power transmission which can be utilized for a wide variety of purposes. For example, the present power transmission is particularly applicable for use as an SAE flywheel mounted reverse reduction gear with clutches, as a marine reduction gear without clutches, as an SAE flywheel mounted reduction gear, for use as an SAE flywheel mounted speed increasing gear, for use as a reduction gear, a speed increasing gear, and a motor reducer gear and the like. The power transmission of the present invention is particularly applicable for marine power transmissions in view of its compactness, resulting low center of gravity of vessel, symmetry, service ability of clutches and the like.

It is yet a further object and feature of the present invention to provide a power transmission of the gear type in which flexibility is obtained by variable boring of the end plates and housing body while utilizing standard gear components.

Figure 2:
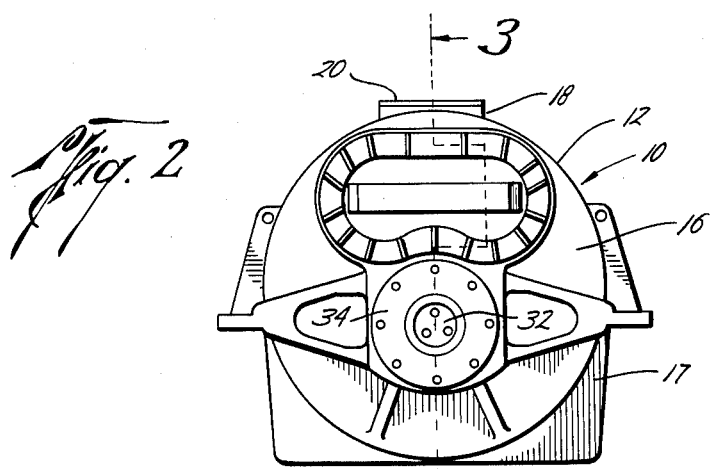
Figure 3:
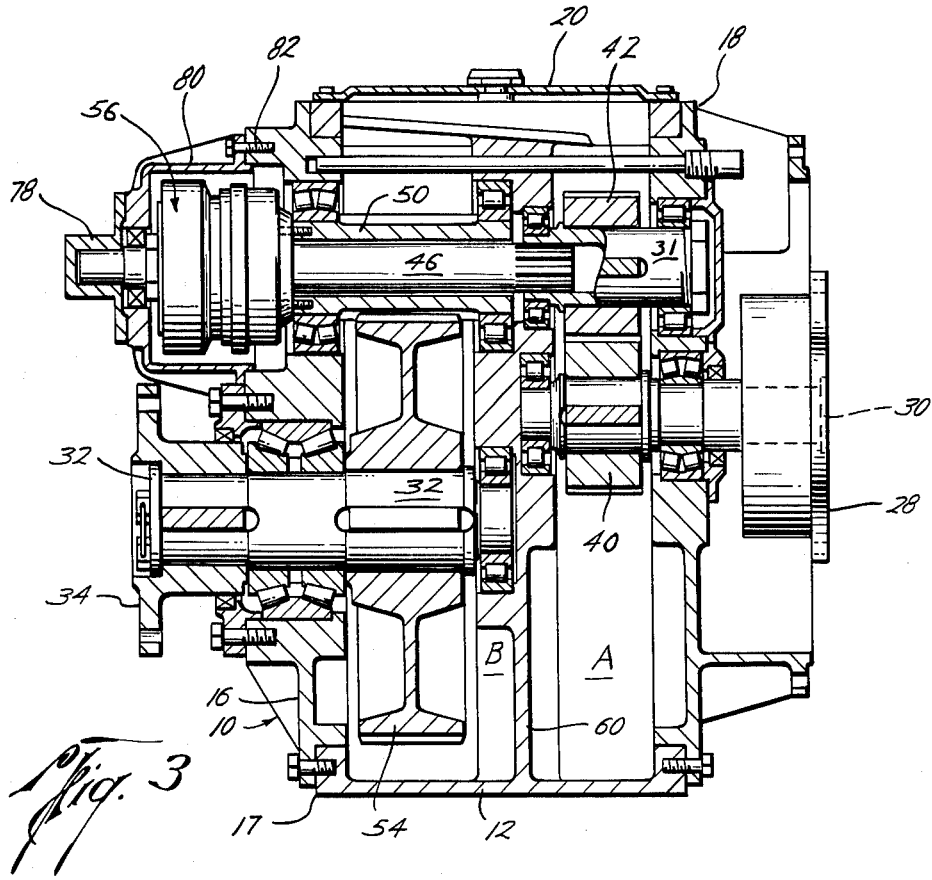
Figure 4:
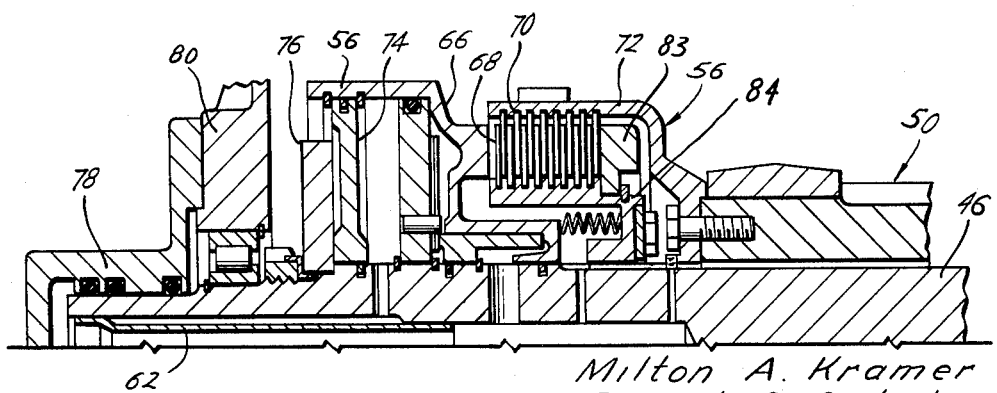
Figure 5:
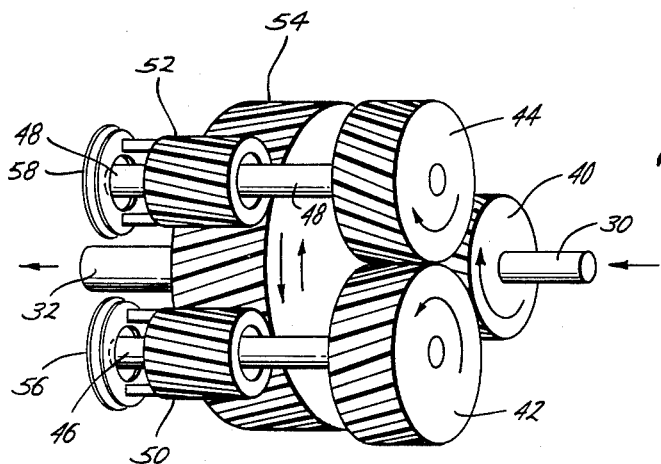
Figure 6:
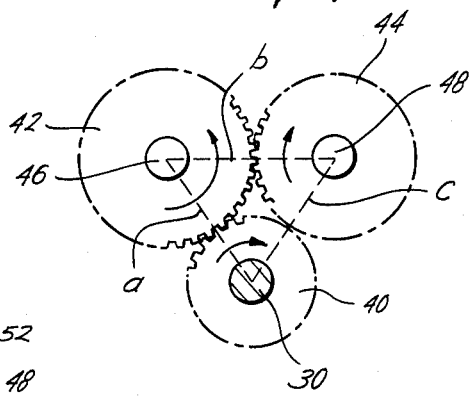
Figure 7:
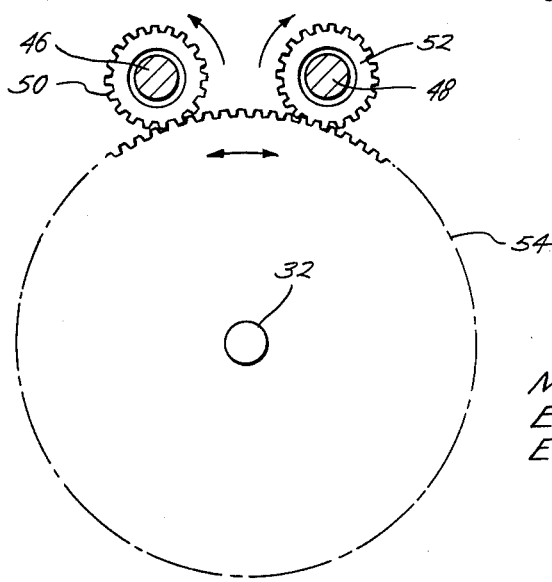
Figure 8:
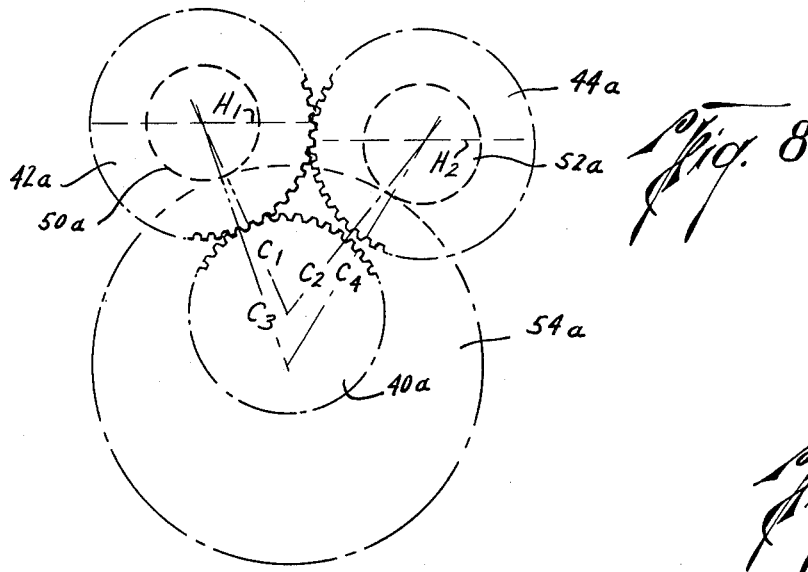
Figure 9:
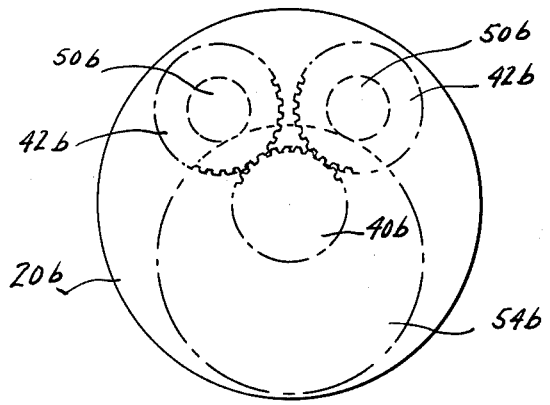
Figure 10:
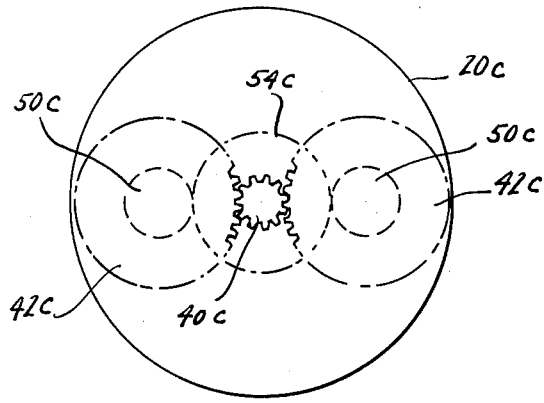

Other and further objects, features and advantages will be apparent from the following description of a presently preferred embodiment of the invention, given for the purpose of disclosure and taken in conjunction with the accompanying drawings, in which like reference numerals designate like parts throughout the several views, and where, FIGURE 1 is an elevational view of the input end of the power transmission, FIGURE 2 is a view similar to that of FIGURE 1 illustrating the output end of the power transmission, FIGURE 3 is a cross-sectional view taken along the line 3—3 of FIGURE 2, FIGURE 4 is a cross-sectional, fragmentary view illustrating a clutch particularly adapted for use with the power transmission of the present invention, FIGURE 5 is a perspective view illustrating a gear arrangement of the present invention, FIGURE 6 is a front elevational view of an input or high speed set of gears of the power transmission, FIGURE 7 is a back elevational view of the output or slow speed set of gears of the power transmission, FIGURE 8 is a view similar to FIGURE 6 and illustrates a near symmetrical arrangement of the input or high speed set of gears of a reverse power transmission, FIGURE 9 is a still further embodiment illustrating a near inline embodiment of a multi-articulated power transmission, and FIGURE 10 is a view similar to FIGURE 9 illustrating an inline embodiment of a multi-articulated power transmission.

Referring now to the drawings, and particularly to FIGURES 1 and 2, the power transmission is generally indicated by the reference numeral 10 and includes a generally cylindrically-shaped central body portion 12 provided with a generally circularly-shaped input plate cover 14 and output plate cover 16.

A base 17 is provided which serves as an oil sump, and an access opening 18 is provided at the top which is closed by the closure 20 for inspection and the like.

On each side of the central cylindrical body section 12 there is provided the lifting gussets 22 and mounting flanges 24 for handling and mounting the power transmission.

The high speed end plate cover 14 is provided with an SAE flywheel housing adapter ring 26 which mounts the transmission directly to the flywheel housing, not shown. Input torque is transmitted from the flywheel, not shown, through the flanged torsionally resilient coupling 28 connected to the single input shaft 30.

As best illustrated in FIGURE 2, to which reference is now made, the output shaft 32 is connected to the flanged half coupling 34 for connection to the driven shaft, not shown, from the power transmission.

No more details or description of the housing or body is given, however, it is noted that in one aspect of the invention the housing is generally symmetrical about a central vertical plane which has the advantages previously mentioned.

The arrangement of the gears of the power transmission is best illustrated in FIGURES 5, 6 and 7. Referring first to FIGURE 5, it is noted that the single input shaft 30 is connected to a drive pinion or gear 40 which meshes with and drives the high speed forward gear 42, which, in turn, meshes with and drives the high speed reverse gear 44. The high speed forward gear 42 is disposed on the internally-splined shaft 31 (FIGURE 3). Similarly, the high speed reverse gear is mounted on an internally-splined shaft, not shown. The forward speed quill shaft 46 interfits in splined relation with the internally-splined shaft 31 (FIGURE 3), and the reverse speed quill shaft 48 is similarly splined into the shaft for the reverse speed gear 44.

Disposed about the forward speed quill shaft 46 is the hollow pinion or gear 50 and disposed about the reverse speed quill shaft 48 is the hollow pinion or gear 52, both of which permanently mesh with the bull or reduction gear 54 and drive the bull gear in either a forward or reverse direction upon actuation of their respective clutches 56 and 58. To this end there are connected to the clutch ends of the pinions 50 and 52 the clutch adapters 72 (see FIGURE 4) into which the clutch driving plates 70 are slidably enmeshed.

It is noted in the arrangement illustrated that there are only six gears and that there is a near inline arrangement of the input shaft 30 and the output shaft 32. This is accomplished because of the special arrangement of the high speed gears 40, 42 and 44.

The arrangement of the high speed gears 40, 42 and 44 is best illustrated in FIGURE 6, to which reference is now made. In this aspect of the invention the center of each of these gears on parallel shafts is on the point of an imaginary isosceles triangle as indicated by the dotted lines a, b and c, and the reverse gear 44 is of a size with respect to the forward rotation gear 42 so that the reverse gear 44 is spaced from and does not mesh with the input driving gear or pinion 40. This is accomplished by making the reverse gear 44 smaller than the forward rotation gear. In addition, the gears 40, 42 and 44 are vertically aligned. In marine applications, preferably the reverse gear 44 should be about 2% to about 10% smaller than the forward gear 42 because the propellers are not as efficient in reverse as in forward speed and this difference minimizes or eliminates this loss of thrust or power.

The details of the gear assembly arranged within the housing are best illustrated in FIGURE 3, to which reference is now made. The housing is generally divided into a high speed compartment A, and a slow speed compartment B, by means of the central partition 60. In the high speed compartment are arranged the high speed gears or pinions 40, 42 and 44. The latter is not visible in this view, but is constructed the same as the pinion 42. The low speed pinions 50 and 52, the latter not being visible in this view, and bull or reduction gear 54 are disposed within the low speed compartment B of the housing. In order to shorten the disclosure, and since the invention is primarily concerned with the relation between the gears and their arrangement within the housing, no detailed description of the means for securing the gears on their respective shafts, the anti-friction assemblies rotatably journalling the shafts in the body or housing, sealing rings and the like is given, although such an arrangement is generally shown in FIGURE 3, but not specifically identified by numerals since the details are well known in the art. FIGURE 3, however, discloses a satisfactory arrangement of gears according to the invention housed in a suitable housing according to the invention and shows the various components suitably disposed and supported in the body.

While any desired clutch arrangement may be utilized, however, for maintenance and repair, it is preferably that a unitized clutch pack assembly be used and that both forward and reverse clutches are identical and interchangeable assemblies. Preferably, each clutch should incorporate a mechanical lockup feature for emergency operation in the event of hydraulic failure, and preferably, the clutches should be of the hydraulic actuated type. In addition, it is preferable that the clutch assemblies be located side by side and outside the gear housing. This results in a shortened overall coupling to coupling length by an amount equal to the length of the clutches and the clutches are not required to act as a misalignment medium between engine and gear as in other arrangements. In addition, such a clutch pack or assembly arrangement provides maximum serviceability in that the clutches may be expeditiously and easily removed as a unit for either inspection or replacement and the interchangeable feature between forward and reverse clutches provides a built in running spare for emergency "come-home" operation when used in marine vessels in the event the forward clutch fails or malfunctions and at times and place when normal service or parts are unavailable.

FIGURE 4 is a sectional, fragmentary view, illustrating a satisfactory clutch pack or assembly for use with the present power transmission. The clutch assembly itself is described in detail and claimed in our corresponding application, Serial No. 339,952, filed January 24, 1964 and as such, does not form a part of the present invention, although its location and arrangement with the gears comprises one aspect of the present invention.

With specific reference to FIGURE 4, the clutch pack assemblies 56 are each built up subassemblies, unitized upon and about their respective clutch quill shafts. The drive extension of each of these shafts is of such length and diameter so as to provide torsional flexibility between driving and driven members, thus greatly reducing peak stresses from dynamic shock loads and critical vibrations so that the life of all associated stressed components within the transmission system is extended or enhanced.

As illustrated in FIGURE 4, disposed on the quill shaft 46 is an actuator force piston assembly 66, a reaction plate 83 and a hub 84. Between the actuator piston and reaction plate are alternately stacked the driving clutch plate 68, slidable on the hub, and the driven clutch plates 70, slidably enmeshed with the clutch drum adapter 72. A piston retainer plate 74 and a reaction plate 76 for mechanical actuation of the piston, generally completes the unitized clutch pack assembly. The driven end of each of the quill shafts, the quill shaft 46 being illustrated in FIGURE 3, is externally splined and slidably meshes with the internally splined gear shaft, here shown as the gear shaft 31. The clutch drum adapter 72 and the clutch pack assembly 56 is enclosed by the cover 80 secured by the bolts 82 and end of the quill shaft 46 is enclosed by the oil supply cover 78.

The remaining parts of the clutch pack are illustrated, but no specific reference numerals are designated as to these parts as a complete description thereof is contained in our copending application, previously mentioned.

While the particular clutch assembly illustrated and described is particularly advantageous and useful with the power transmission, in one aspect of the present invention, any suitable clutch arrangement may be utilized. For example, the clutch assemblies illustrated in United States Patents Nos. 2,868,341 and 2,920,732, modified to be positioned as indicated with respect to the gear arrangement may be utilized.

Accordingly, no further detailed description of the clutch assembly is deemed necessary or given. As previously mentioned, however, the reverse gear clutch assembly is identical to the forward speed clutch assembly which has been described in some detail.

It is noted, however, that disposed on the output end plate 16 are the clutch covers 78 and 80 which are removably secured thereto, such as by the bolts 82 so that these clutch covers 80 may be quickly removed from the output cover plate 16 and the entire unitized clutch assembly removed.

Referring now to FIGURE 8 another embodiment of a reverse reduction gear type transmission of the invention is illustrated. In this view the reference letter "a" has been added to numerals indicating corresponding parts in the preceding views for convenience of reference. In this embodiment it is necessary that the forward gear 42a and the reverse gear 44a be located at different center distances to prevent them from both meshing with the input gear 40a. This is accomplished by offsetting one of the gears 42a and 44a to provide a near symmetrical arrangement. As here shown the center lines $C_1$ and $C_2$ between the gears 40a, 42a, and 44a are unequal in length. The center lines $C_3$ and $C_4$ between the gears 42a, 44a, 50a, 52a and 54a are equal. The center line $C_1$ is shorter than the center line $C_2$ and the centerlines $C_3$ and $C_4$ are equal. Thus, a near symmetrical arrangement is provided in which one of the gears 44a does not mesh with the input gear 40a and the gears 42a and 44a may be of the same, or different size, if desired.

The remaining components are the same as in the preceding figures and, accordingly, no more description of this embodiment is deemed necessary or given.

In both embodiments, the shafts on which the gears are mounted are parallel to one another, and two sets of gears are disposed on the shafts which are axially-spaced from one another. It is only necessary in a reversing transmission that the reverse speed gear be out of mesh with the input gear and be driven by the forward speed gear.

The embodiments of FIGURES 9 and 10 illustrate multi-articulated forward speed transmissions, the reference letter "b" being applied in FIGURE 9 and the reference letter "c" being applied in FIGURE 10 to numerals designating corresponding parts in the preceding views.

Referring to FIGURE 9, a multi-branch gear transmission of two branches is illustrated using the marine transmission housing as shown in the preceding figures. In this variation, a non-reversing transmission is assembled with near in-line shafting. Two identical high speed gears 42b mesh with the common input pinion 40b. In like manner, and axially aligned with the high speed gears 42b are two identical slow speed pinions 50b which mesh with a common slow speed gear 54b. These high speed gears and slow speed pinions may be coupled together by suitable means, such as the hydraulic disconnect clutch packs previously described earlier, or other suitable fixed coupling means. Each branch and gear mesh transmits rated capacity. Since this arrangement provides twin-articulated branches within the same size housing as a single branch arrangement, a high capacity transmission of approximately double rating results. Thus a compact, high capacity transmission is provided for either speed increasing or speed reducing applications from a minimum number of standardized components or parts.

Referring to FIGURE 10, an in-line multi-branch articulated transmission is illustrated. While two branches are shown, in the in-line shafting arrangement, any number of branches of high speed gears 42c and slow speed pinions 50c, meshing with the common high speed pinions 40c and slow speed gear 54c, may be provided with suitable boring of the housing. This multi-branch arrangement again results in extremely high capacity, compact transmissions of great flexibility as to end use applications, whether speed increasing or reducing from the same or similar standardized components of the power transmission.

The remaining parts of FIGURES 9 and 10 are the same as those in the preceding figures and no further description thereof is deemed necessary or given.

Thus, the arrangement of the power transmisison can be varied considerably for various uses and applications yet still use a number of standard components.

Power transmissions of the above type have the many advantages, features and uses mentioned as well as others inherent therein and are well suited and adapted to attain the objects and ends previously mentioned.

While presently-preferred embodiments of the invention have been given for the purpose of disclosure, changes in details, arrangements and uses of the power transmission will occur to those skilled in the art which are encompassed within the spirit of the invention as defined by the scope of the appended claims.

What is claimed is:

1. In a reversing power transmission, an input shaft, a forward rotation shaft, a reverse rotation shaft, said shafts being disposed in spaced parallel relation to one another, a gear fixed on each shaft, said gears being aligned with one another transversely of the axes of the shafts, the centers of the gears on the forward rotation shaft and the reverse rotation shaft being equi-distant from the center of the input shaft, said gears being arranged so that the gear on the input shaft meshes with and drives the gear on the forward rotation shaft, the gear on the forward rotation shaft meshes with and drives the gear on the reverse rotation shaft, and the last mentioned gear is spaced from and is out of meshing engagement with the gear on the input shaft, an output shaft, gear means actuated by the forward rotation shaft and the reverse rotation shaft operatively connected to and actuating the output shaft, and clutch means arranged to operatively and selectively engage said forward rotation shaft and said reverse rotation shaft with said gear means.

2. The power transmission of claim 1 where the axes of the input shaft and the output shaft are substantially in line with one another.

3. The power transmission of claim 1 including a housing about the power transmission, said housing being substantially symmetrical with respect to a vertical plane passing through the axes of the input shaft and the output shaft.

4. The power transmission of claim 1 including a housing about the power transmission, and where the clutch means comprises unitized clutch assemblies secured to the housing in side by side relation to each other.

5. A power transmission comprising, an input shaft, at least one forward rotation shaft, at least one reverse rotation shaft, said shaft being disposed in spaced parallel relation to one another, a gear fixed on each shaft, said gears being aligned with one another transversely of the axes of the shafts, the centers of the gears on the forward rotation shaft and the reverse rotation shaft being equi-distant from the center of the input shaft, said gears being arranged so that the gear on the input shaft meshes with and drives the gear on the forward rotation shaft, the gear on the forward rotation shaft meshes with and drives the gear on the reverse rotation shaft, and the last mentioned gear is spaced from and out of meshing engagement with the gear on the input shaft, an output shaft, an output gear fixed on the output shaft, a pinion rotatably disposed on each of the forward rotation shaft and the reverse rotation shaft in permanent meshing engagement with the output gear and aligned therewith transversely of the axes of the shafts, and a clutch disposed on each of the forward rotation shaft and the reverse rotation shaft operable to selectively engage the pinion on its respective shaft for rotating the output gear in a forward rotation direction and a reverse rotation direction.

6. The power transmission of claim 5, where, the output shaft and the input shaft are substantially in line with one another.

7. The power transmission of claim 5, where, the clutch means comprise a pair of unitized clutch assemblies, one each of said clutch assemblies disposed at the trailing end portion of the forward rotation shaft and the reverse rotation shaft.

8. The power transmission of claim 5 including a housing disposed about the power transmision, said housing being symmetrical about a central vertical plane passing through the input shaft and the output shaft.

9. In a reversing power transmission, a housing, an input shaft extending into the housing, a forward rotation shaft in the housing, a reverse rotation shaft in the housing, said shafts being disposed in spaced parallel relation to one another, a gear fixed on each shaft, said gears being aligned with one another transversely of the axes of the shafts, the centers of the gears on the forward rotation shaft and the reverse rotation shaft being equi-distant from the center of the input shaft, said gears being arranged so that the gear on the input shaft meshes with and drives the gear on the forward rotation shaft, the gear on the forward rotation shaft meshes with and drives the gear on the reverse rotation shaft, and the last mentioned gear is spaced from and is out of meshing engagement with the gear on the input shaft, an output shaft extending into the housing, gear means actuated by the forward rotation shaft and the reverse rotation shaft operatively connected to and actuating the output shaft, and a clutch assembly releasably mounted as a unit on the housing for each said forward rotation shaft and said reverse rotation shaft and arranged to operatively and selectively engage said forward rotation shaft and said reverse rotation shaft with said gear means.

10. The power transmission of claim 9 where the clutch assemblies are mounted in the housing externally of the high speed compartment and the slow speed compartment in side by side relationship to one another.

11. The power transmission of claim 9 where the diameter of the gear on the reverse rotation shaft is from about 2% to about 10% smaller than that of the gear on the forward rotation shaft.

References Cited by the Examiner

UNITED STATES PATENTS

| | | | |
|---|---|---|---|
| 2,727,981 | 1/1956 | Budzien | 74—361 |
| 2,943,504 | 7/1960 | Falk et al. | 74—361 |
| 2,973,845 | 3/1961 | Sinclair | 74—361 |

DON A. WAITE, *Examiner.*

DAVID J. WILLIAMOWSKY, *Primary Examiner.*

H. S. LAYTON, *Assistant Examiner.*